(12) United States Patent
Nagasaki et al.

(10) Patent No.: US 6,300,933 B1
(45) Date of Patent: *Oct. 9, 2001

(54) ELECTRONIC APPARATUS AND A CONTROL METHOD THEREOF

(75) Inventors: Katsuhiko Nagasaki, Ichikawa; Eisaku Tatsumi, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/708,413

(22) Filed: Sep. 5, 1996

(30) Foreign Application Priority Data

Sep. 8, 1995 (JP) .................................................. 7-231216

(51) Int. Cl.[7] ........................................................ G09G 5/36
(52) U.S. Cl. ............................................ 345/123; 345/112
(58) Field of Search .................................... 345/173, 179, 345/123, 112; 349/12; 178/18, 19

(56) References Cited

U.S. PATENT DOCUMENTS

| | | | | |
|---|---|---|---|---|
| 4,718,000 | * | 1/1988 | Held ................................. | 364/167.02 |
| 4,769,919 | * | 9/1988 | Lloyd et al. ........................... | 33/558 |
| 5,365,461 | * | 11/1994 | Stein et al. ........................ | 364/528.33 |
| 5,397,865 | * | 3/1995 | Park ........................................ | 178/18 |
| 5,434,371 | * | 7/1995 | Brooks .................................... | 178/18 |
| 5,581,484 | * | 12/1996 | Prince ................................... | 702/150 |
| 5,602,566 | * | 2/1997 | Motosyuko et al. ................. | 345/123 |
| 5,714,972 | * | 2/1998 | Tanaka et al. ....................... | 345/123 |
| 5,917,493 | * | 6/1999 | Tan et al. ............................. | 345/358 |
| 5,923,323 | * | 7/1999 | Chiu et al. ........................... | 345/333 |

* cited by examiner

*Primary Examiner*—Amare Mengistu
(74) *Attorney, Agent, or Firm*—Fitzpatrick, Cella, Harper & Scinto (57) ABSTRACT

An electronic apparatus includes an acceleration sensor, an inclination detector, a pushbutton switch, a use condition detector, a screen control determiner, a screen, and a screen controller. The apparatus is controlled in a method that enables the execution of control in which the contents of operation intended by the user are exactly reflected. The acceleration sensor and the inclination detector detect an inclination of the apparatus. The use condition detector detects the use of the apparatus, based on whether the pushbutton switch is turned on or not. The screen control determiner determines whether or not to execute screen control, based on both the inclination detected by the inclination detector and the use of the apparatus detected by the use condition detector. The screen controller controls the screen, based on the result determined by the screen control determiner.

15 Claims, 10 Drawing Sheets

ELECTRONIC APPARATUS AND A CONTROL METHOD THEREOF

BACKGROUND OF THE INVENTION

1. Field of the Invention

This invention relates to electronic apparatuses, and in particular, an electronic apparatus suitable for a user to carry and operate, and a control method of the apparatus.

2. Description of the Related Art

Conventional portable electronic apparatuses have one type in which a user operates it while holding it. Such an operation mode includes a modification in which a user inclines an electronic apparatus to control its display screen. This electronic apparatus includes an acceleration sensor, so that the display screen is scrolled or the page of the display screen is turned, based on an inclination-detected signal from the acceleration sensor.

However, when the user operates the conventional electronic apparatus while holding it, the holding condition becomes unstable. Accordingly, an inclination of the electronic apparatus, unexpected by the user, causes the accidental control of the display screen. This malfunction substantially raises the problem of inconvenience to the user.

SUMMARY OF THE INVENTION

To solve the above problem, the present invention has been achieved. It is an object of the present invention to provide an electronic apparatus and a control method thereof, which enable the execution of control in which the contents of operation intended by the user are exactly reflected.

In accordance with an aspect of the present invention, the foregoing object is achieved through the provision of an electronic apparatus including: first detection means for detecting an inclination of the apparatus; second detection means for detecting the use of the apparatus; and control means for executing predetermined processing, based on both the inclination detected by the first detection means and the use of the apparatus detected by the second detection means.

In accordance with another aspect of the present invention, the foregoing object is achieved through the provision of a control method of an electronic apparatus, including: a first detection step for detecting an inclination of the apparatus; a second detection step for detecting the use of the apparatus; and a control step for controlling the execution of predetermined processing, based on both the inclination of the apparatus detected by the first detection step and the use of the apparatus detected by the second detection step.

In accordance with a further aspect of the present invention, the foregoing object is achieved through the provision of an electronic apparatus in which a computer unit is controlled by inputting a predetermined program from a memory medium, wherein the memory medium includes: a procedure code used in a first detection step for detecting an inclination of the apparatus; a procedure code used in a second detection step for detecting use of the apparatus; and a procedure code in a control step for controlling the execution of predetermined processing, based on both the inclination of the apparatus detected by the first detection step and the use of the apparatus detected by the second detection step.

In accordance with the present invention, the execution of the processing can be controlled, based on the detected use of the apparatus. Therefore, it is possible to execute control in which the contents of operations intended by the user are exactly reflected.

DESCRIPTION OF THE PREFERRED EMBODIMENTS

An embodiment of the present invention will be described below, by referring to the attached drawings.

First Embodiment

Figure 1:
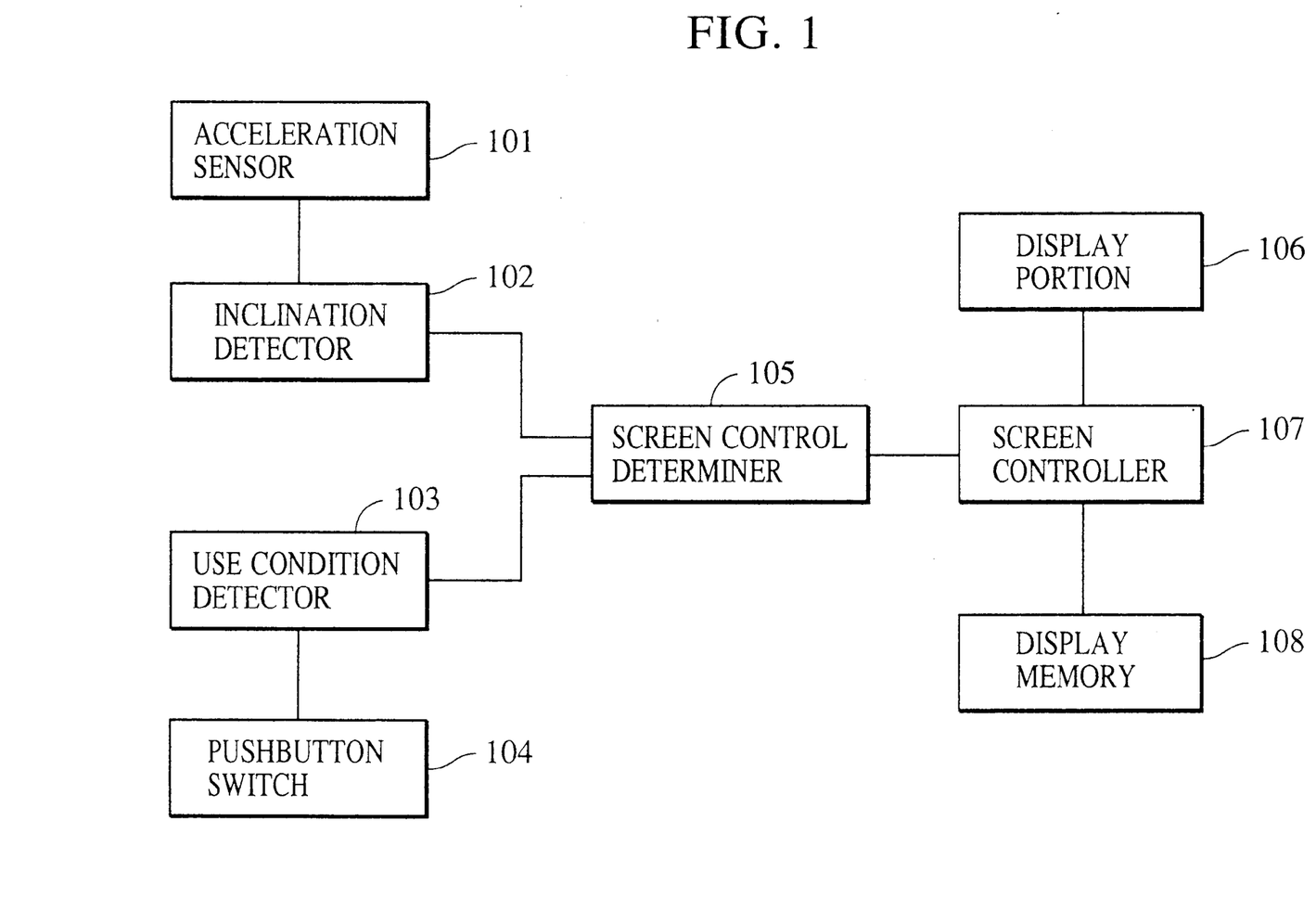
FIG. 1 is a block diagram of an electronic apparatus according to a first embodiment of the present invention.

FIG. 1 is a block diagram of an electronic apparatus according to a first embodiment of the present invention. An acceleration sensor 101 detects a movement of the apparatus. An inclination detector 102 detects the direction and angle of an inclination of the apparatus, in accordance with a signal from the acceleration sensor 101. A use condition detector 103 detects the use of the apparatus, based on whether a pushbutton switch 104 is turned on or not. Turning on the pushbutton switch 104 represents the user's intention of controlling the display screen of the apparatus. A screen control determiner 105 determines whether or not to execute the operation of controlling the screen, and determines the type of the operation of controlling the screen, such as scrolling or turning the display page, in accordance with signals from the inclination detector 102 and the use condition detector 103. A display portion 106 has a display device suitable for the portable electronic apparatus, such as a liquid crystal display or light-emitting diodes. A screen controller 107 controls the display portion 106 in accordance with a signal from the screen control determiner 105. A display memory 108 holds information to be displayed on the display screen included in the display portion 106.

Figure 2:
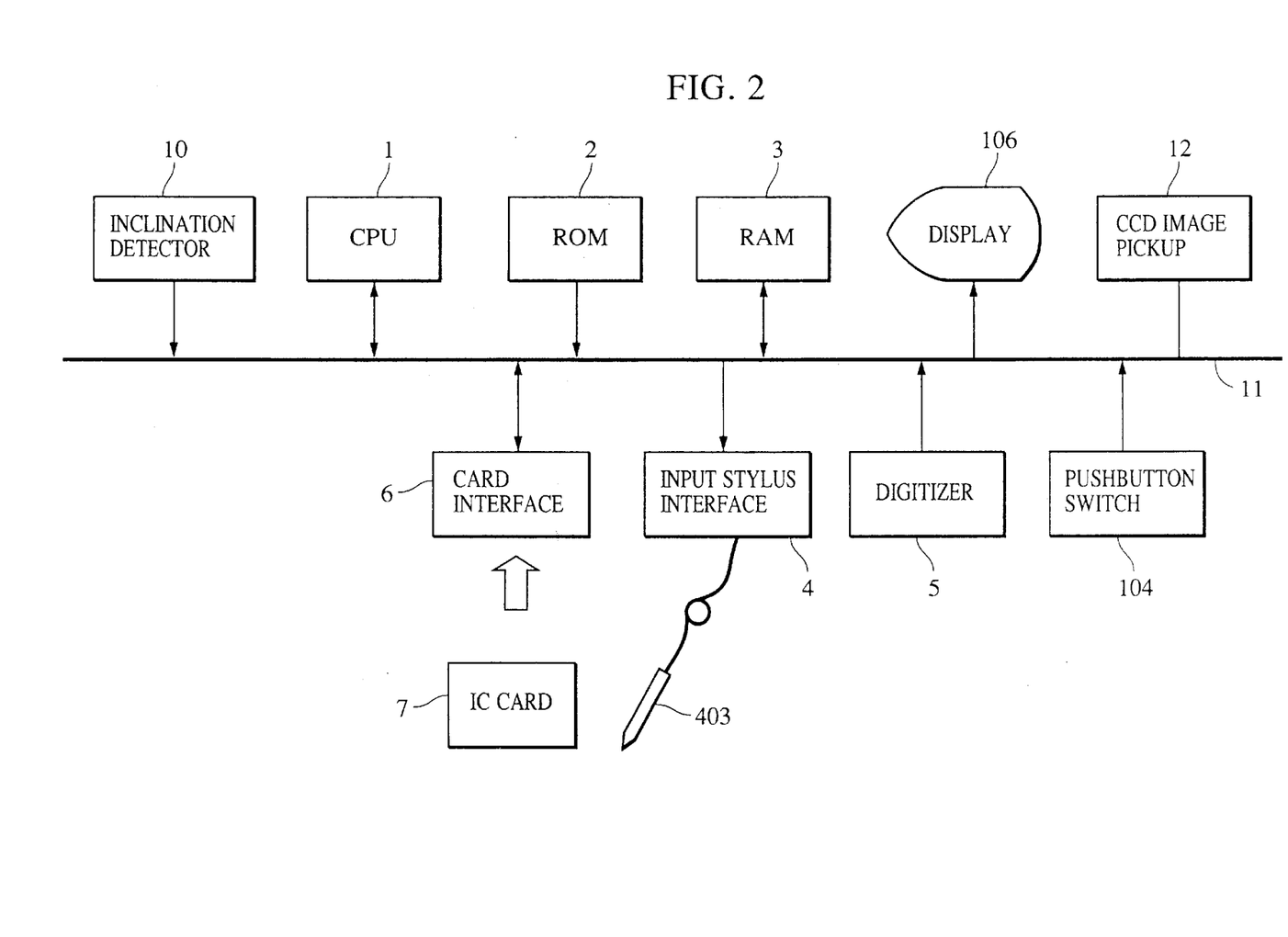
FIG. 2 is a block diagram of the whole control system of the electronic apparatus according to the first embodiment.

FIG. 2 is another block diagram of the electronic apparatus, showing the whole portions of the apparatus, while the block diagram in FIG. 1 shows the portions for controlling the screen.

A central processing unit (CPU) 1 executes either a control program stored in a read-only memory (ROM) 2 or a control program loaded in a random access memory (RAM) 3 to enable various types of control. Various types of control programs are stored in the ROM 2. The control programs include a control program to enable control that is described by a flowchart described below. The RAM 3 supplies work areas for types of processes. An input stylus interface 4 controls an input stylus 403 for designating a target position on a digitizer 5. The digitizer 5 outputs, as coordinates, the position designated with the stylus 403. The digitizer 5 is comprised of a transparent board, and is overlaid on the display portion 106.

A card interface 6 can send data to an integrated circuit (IC) card or receive data therefrom when the IC card is mounted in the interface 6. An inclination detector 10 includes the acceleration sensor 101 and the inclination detector 102, both shown in FIG. 1. A bus 11 is a data path between the portions of the electronic apparatus. A charge-coupled device (CCD) image pickup 12 is not necessary in the first embodiment and the following second embodiment, but is necessary in the following third embodiment.

The execution of the predetermined program by the CPU 1 enables both the screen control determiner 105 and the screen controller 107 to function. The region of the display memory 108 is reserved in the RAM 3.

Figure 3:
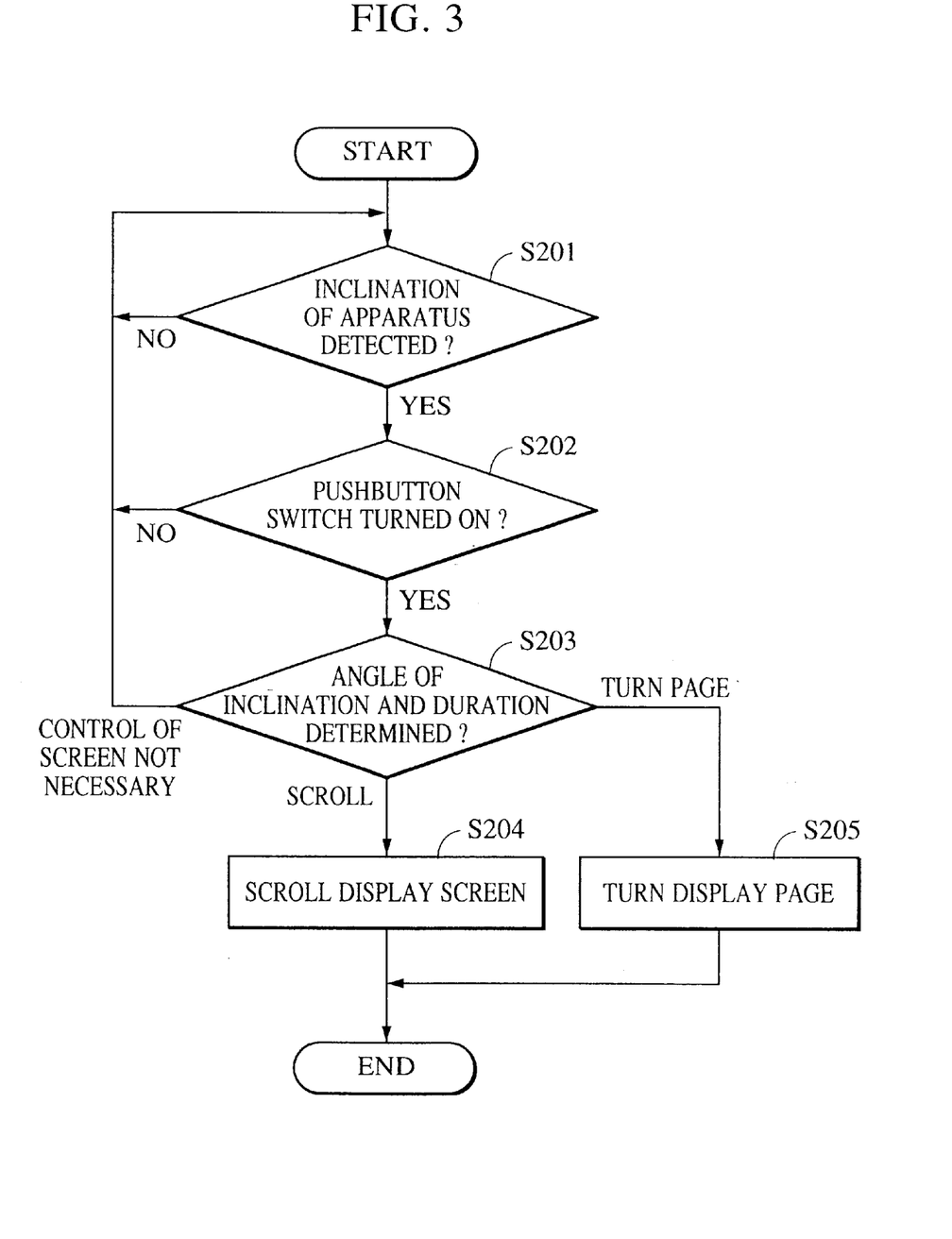
FIG. 3 is a flowchart showing a procedure for controlling the display screen of the electronic apparatus according to the first embodiment.

By referring to FIG. 1, FIG. 2, and FIG. 3 showing an operation flowchart, the operation of the electronic apparatus according to the first embodiment will be described. The operation flowchart in FIG. 3 describes the procedure of controlling the display screen of the apparatus according to the first embodiment. A control program shown by the flowchart is stored in the ROM 2. However, with this control program stored in the IC card 7, it may be loaded into the RAM 3 in order to be executed by the CPU 1.

The acceleration sensor 101 detects a move of the electronic apparatus, and sends the detection signal to the inclination detector 102. The inclination detector 102 detects the direction and angle of the inclination, based on the detection signal, and sends the detected result as an inclination-detected signal to the screen control determiner 105. Detecting the angle of an inclination by an acceleration sensor will be omitted since such a technique is known.

On receiving the inclination-detected signal (step S201), the screen control determiner 105 determines whether the use-detection signal from a use condition detector 103 represents the turning on of the pushbutton switch 104 (step S202) or not. The use condition detector 103 always monitors the condition of the pushbutton switch 104, and always sends the use-detection signal to the screen control determiner 105. In this embodiment, when the use condition detector 103 determines that the pushbutton switch 104 is turned on, the screen is controlled, based on the inclination-detected signal.

In step S202, when the pushbutton switch 104 is determined to be turned on, the process proceeds to step S203, in which the screen control determiner 105 determines whether or not to execute screen control, and determines the type of screen control, based on the inclination-detected signal. This determination technique will be described below.

Figure 4:
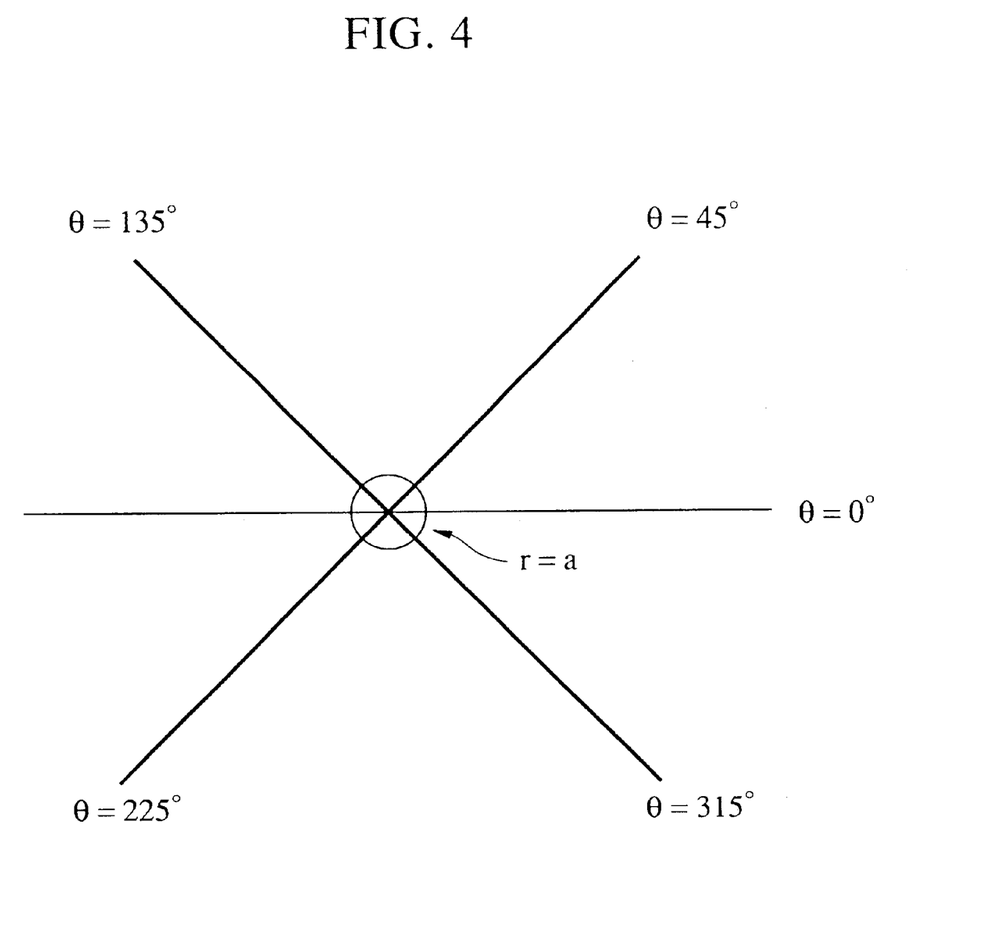
FIG. 4 is a polar coordinate chart in which an inclination-detected signal in the first embodiment is shown.

At first it is determined whether or not the inclination-detected signal is being sent for a constant duration without interruption. If not, screen control is not performed. Only when the inclination-detected signal has been sent for a constant duration or longer, the type of screen control is determined, based on both the direction and angle of an inclination represented by the inclination-detected signal. The inclination-detected signal is sent, based on the polar coordinate system, as shown in FIG. 4. The inclination-detected signal is expressed as (r, θ), where "r" represents the angle of the inclination; and θ, the direction of an inclination.

(a) Necessity of screen control:
if r<<a, screen control is not necessary, and
if r>a, screen control is necessary,
where a represents a predetermined angle. As a result, by inclining the electronic apparatus at not less than the predetermined angle in a certain direction, screen control can be performed.

(b) Types of screen control:
if a<r<<b, the display screen is scrolled, and
if r>b, the page of the display screen is turned,
where "a" and "b" represent predetermined values, their relation is expressed as a<b. As a result, when the angle of the inclination is greater than "a" and less than "b", the display screen is scrolled. When it is greater than "b", the page of the display screen is turned.

When the determination has been completed in step S203 as described above, the process proceeds to one step of step S204, S205 and S201. In other words, when it is determined that control of the screen is not necessary in the above case (a), the process returns to step S201. When it is determined that control of the screen is necessary in the above case (a), the type of the control is determined by comparing the angle of the inclination and the value b. When the determined type is scroll, the process proceeds to step S204. When the determined type is the turning of the page, the process proceeds to step S205.

In steps S204 and S205 the details of the processing are determined to control the screen, based on the angle of the inclination, θ.

(c) Direction of screen control
In scrolling (step S204),
if 0°<<θ<45° or 315°<<θ<<360°, right,
if 45°<<θ<135°, up,
if 135°<<θ<225°, left,
if 225°<<θ<315°, down.
In turning the page (step S205),
if 0°<<θ<90° or 270°<<θ<<360°, next page,
if 90°<<θ<270°, previous page.

In step S204 or S205, the screen controller 107 controls the screen, based on the above determination. When it is determined to perform scrolling, the screen is scrolled by changing the area of the display information to be transferred from the memory 108 to the display portion 106, in accordance with the direction of scrolling (step S204).

When it is determined to perform turning the page, the previous or the next page is opened by changing the display information to be transferred from the memory 108 to the display portion 106, in accordance with the direction of opening (S205).

Figure 5:
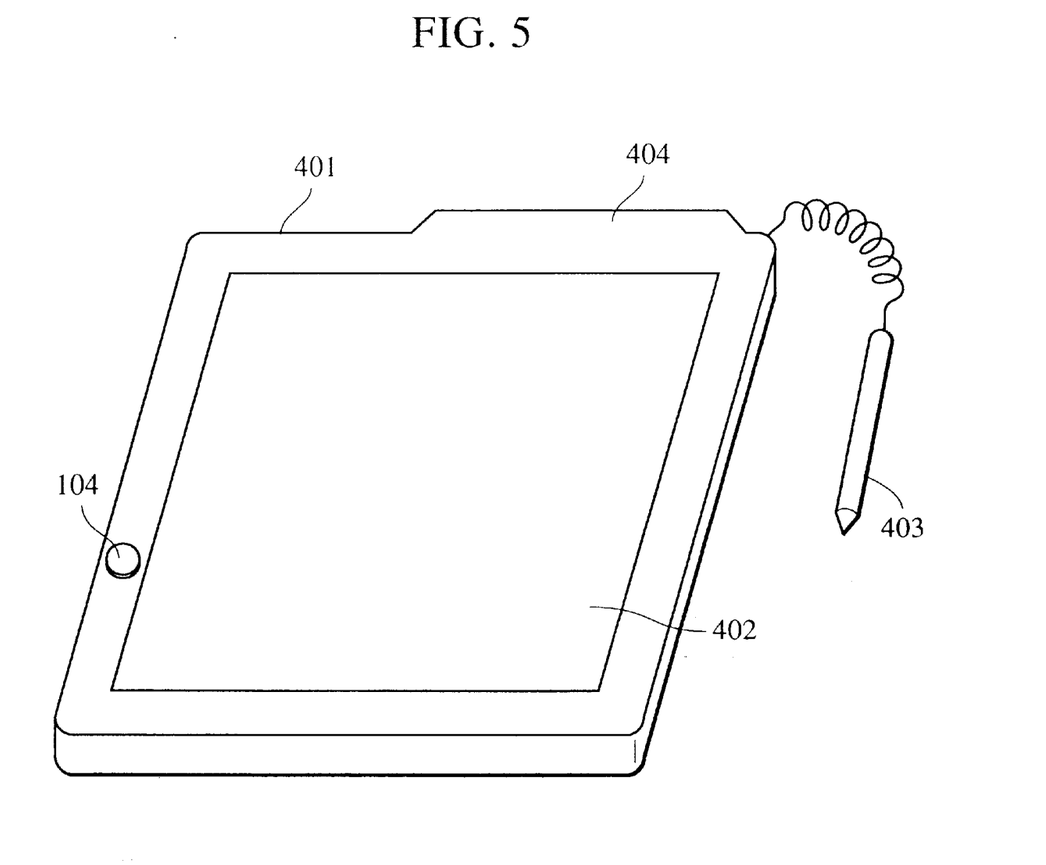
FIG. 5 is a perspective view illustrating an example of the appearance of the electronic apparatus according to the first embodiment.

FIG. 5 is a perspective view illustrating an example of the appearance of the electronic apparatus according to this embodiment. The apparatus has a body 401, an input/output board 402 in which the display portion and the digitizer are incorporated, an input stylus 403 used for inputting to the digitizer, and a pen holder 404 for holding the stylus 403. In addition, a pushbutton switch 104 is disposed in the position shown.

In this arrangement, when the user wants to control the screen by an inclination of the apparatus, the user may incline the apparatus while pushing the pushbutton switch 104. Otherwise, when the user handles the apparatus, not pushing the pushbutton switch 104, screen control by an inclination of the apparatus can be forbidden, which thus prevents the conventional unexpected control of the screen. Further, by disposing the pushbutton switch 104 in the position in which the user can easily operate it when the user ordinarily holds the apparatus, the user can operate it without feeling any inconvenience.

Second Embodiment

In the first embodiment the use condition detector 103 is switched on such that the user turns on the pushbutton switch 104. However, it may be switched on by another way. The control method of the screen also may be performed by another method. In a second embodiment of the present invention the detection of the use of the apparatus by the use condition detector 103 is performed by determining whether the stylus 403 is present or not in the stylus holder 404. As a control method of the screen a window overlapping control is employed. This second embodiment will described below.

The structure and appearance of an electronic apparatus according to the second embodiment are similar to those in the first embodiment (FIGS. 1, 2, and 5). The following description is about the difference of the second embodiment from the first embodiment.

Figure 6:
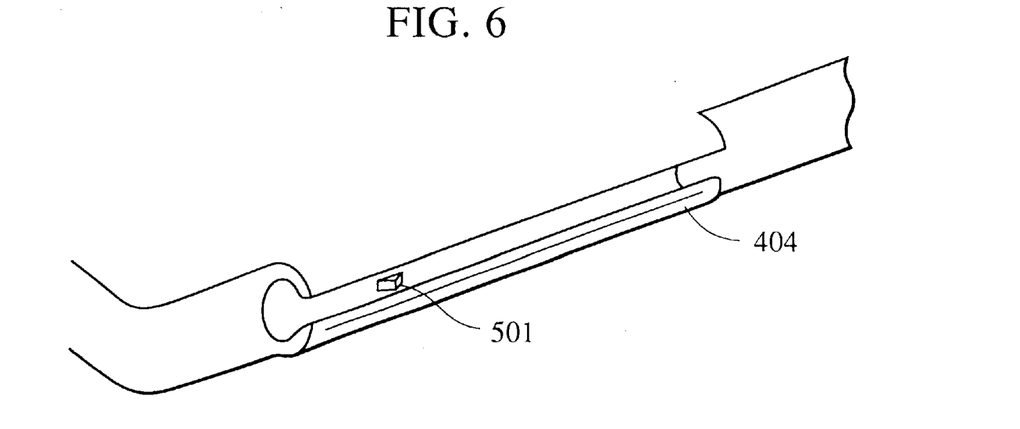
FIG. 6 is a perspective view illustrating the details of a stylus holder in an electronic apparatus according to a second embodiment.

FIG. 6 is a detail view illustrating a stylus holder 404 of the apparatus according to the second embodiment. This stylus holder 404 has a pushbutton switch 501 that is turned on when the stylus is held in the stylus holder 404.

Figure 7:
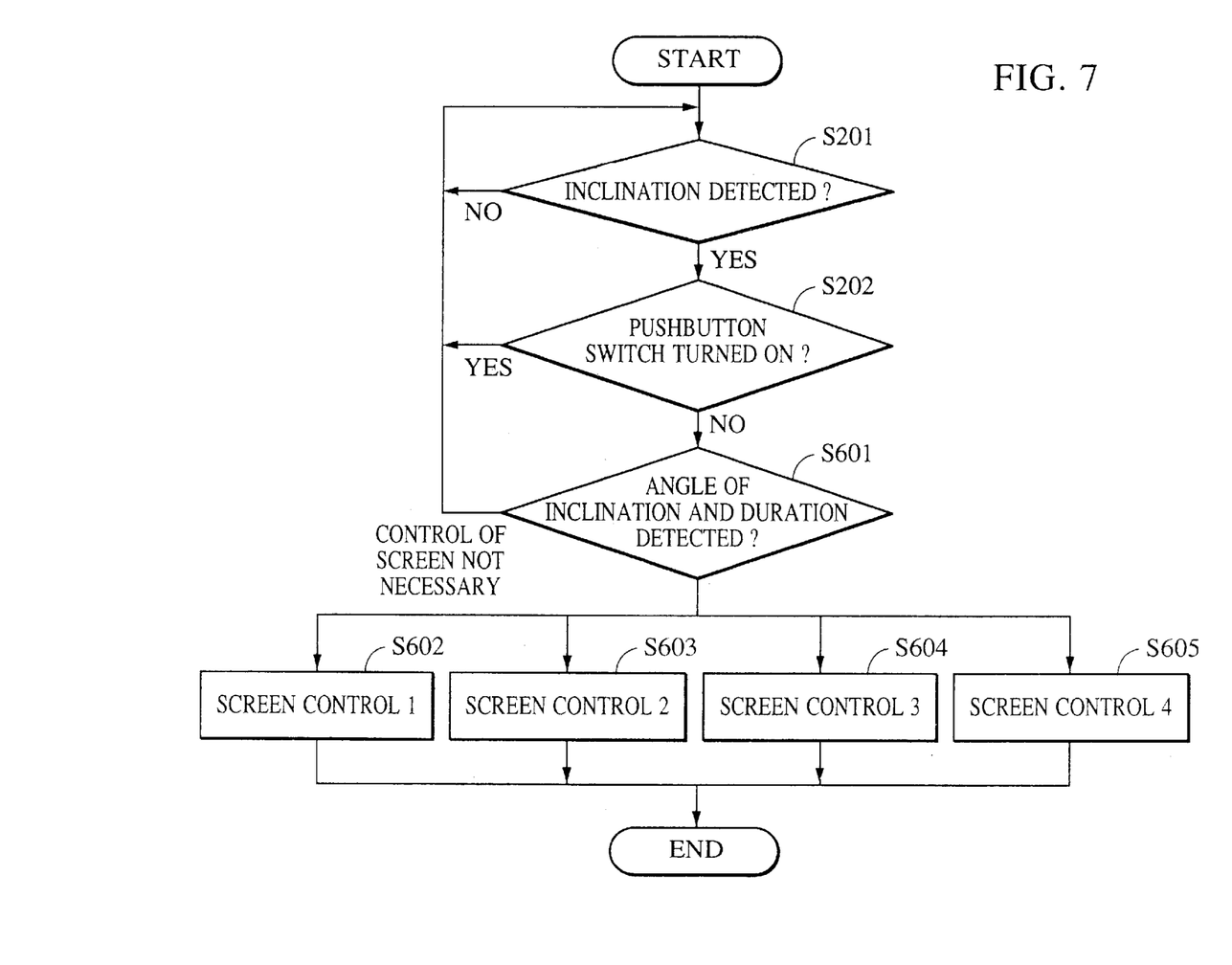
FIG. 7 is a flowchart showing a procedure for controlling the display screen of the electronic apparatus according to the second embodiment.

FIG. 7 is a flowchart that represents the procedure of controlling the screen in the apparatus according to the second embodiment. The description of steps S201 and S202 will be omitted since they have been described by using the flowchart shown in FIG. 3. In step S601 the type of controlling the screen is determined, based on both the angle of the detected inclination (the direction and angle of the inclination) and the detection period.

At first, the determination of screen control is performed in the same manner as in the first embodiment. That is,
(a) Necessity of screen control:
  if r<<a, screen control is not necessary, and
  if r>a, screen control is necessary.
Based on the inclination-detected signal (r, θ), the type of screen control is determined as follows:
(b) Types of screen control
  If 0°<<θ<45° or 315°<<θ<<360°, the last window is moved to the front (screen control 1).
  If 45°<<θ<135°, all windows are displayed in the form of tiles (screen control 2).
  If 135°<<θ<225°, the front window is moved furthest to the rear (screen control 3).
  If 225°<<θ<315°, all windows are displayed as they are overlapped so that their titles appear (screen control 4).
The methods of the screen control 1 to 4 correspond to steps S602, S603, S604, and S605, respectively. Each screen control is performed in accordance with the result of determination in each step. The methods of the screen control are based on the conventional manner, and the description of the methods will be omitted.

As described above, in the second embodiment the use of the apparatus is detected by determining whether or not the stylus 403 is present in the stylus holder 404. Accordingly, the user can forbid the execution of the screen control by putting the stylus 403 in the stylus holder 404, and for the user the apparatus is more convenient.

Third Embodiment

In the first and second embodiment the use condition detector 103 determines the condition of the apparatus, based on whether the pushbutton switch 104 is turned on or not. However, it may determine the condition by detecting the direction of the user's view.

Figure 8:
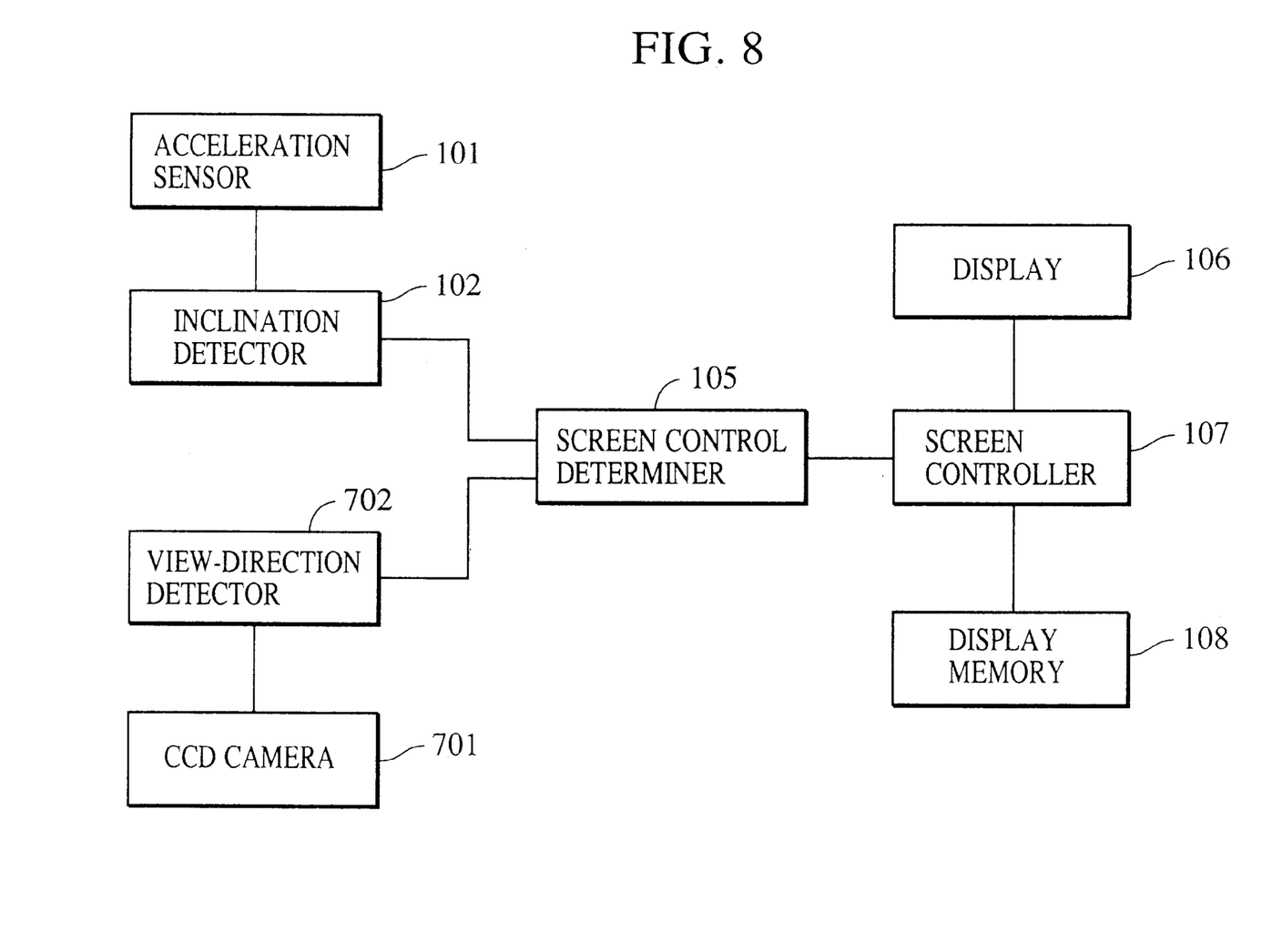
FIG. 8 is a block diagram of an electronic apparatus according to a third embodiment of the present invention.
Figure 9:
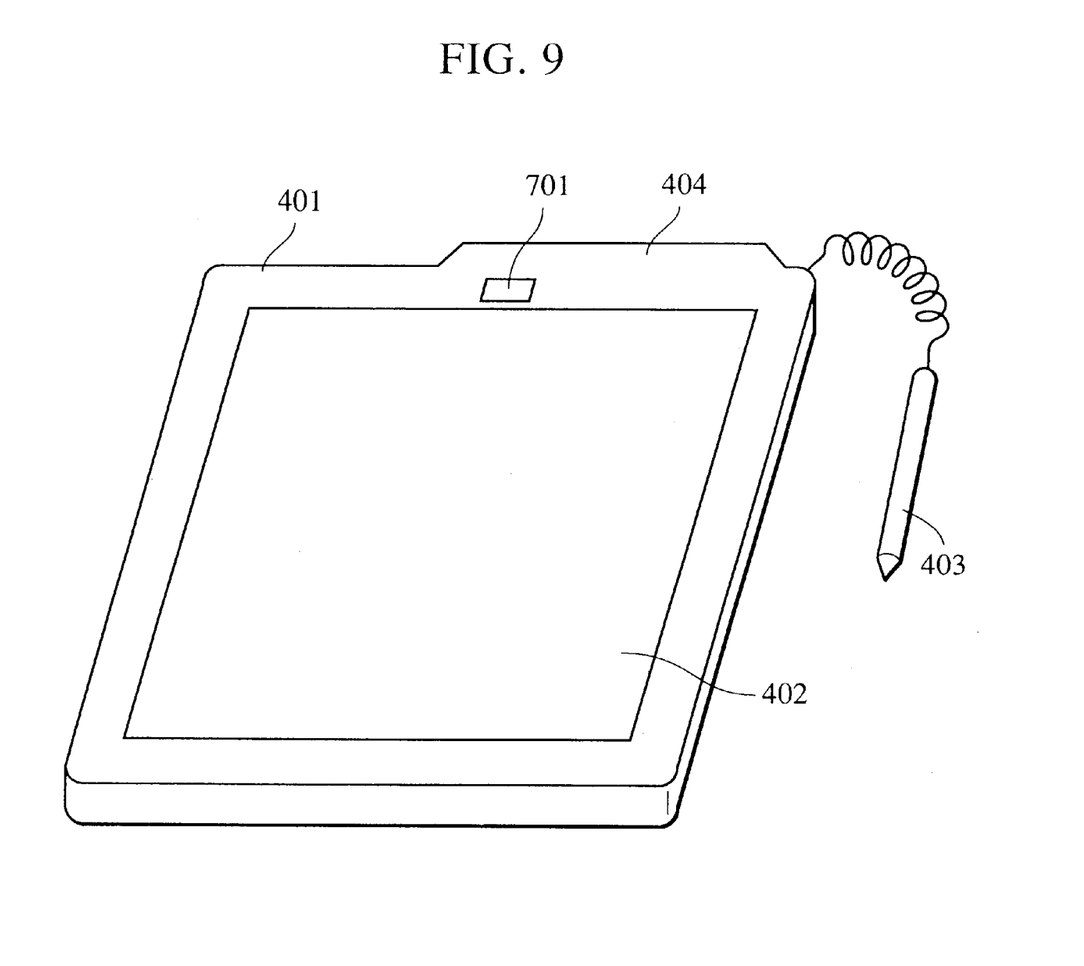
FIG. 9 is a perspective view illustrating an example of the appearance of the electronic apparatus according to the third embodiment.

FIG. 8 is a block diagram of an electronic apparatus according to a third embodiment of the present invention. Components that are the same as those in the apparatus according to the first embodiment are denoted by the same reference numerals, and the description of the same portions will be omitted. In FIG. 9 the appearance of the apparatus according to the third embodiment is shown.

A CCD camera 701 is mounted in an appropriate position of an electronic apparatus 401, as shown in FIG. 9. This CCD camera 701 is used for picking up the face of the user who operates the apparatus 401. A view-direction detector 702 takes in the image from the CCD camera 701 to determine whether the view of the user is directed to the apparatus or not. The view-direction detector 702 takes in the image from the CCD camera 701 at fixed intervals, and extracts the outline of the user's face and the positions of both eyes from the image from the CCD camera 701. This technique is conventionally known, and its description will be omitted. When the view-direction detector 702 is unable to extract the outline of the user's face, it determines that the user is absent from in front of the apparatus, and sends a signal representing the non-use condition to a screen control determiner 105.

The above-mentioned CCD image pickup 12 shown in FIG. 2 includes a CCD camera 701.

Figure 10:
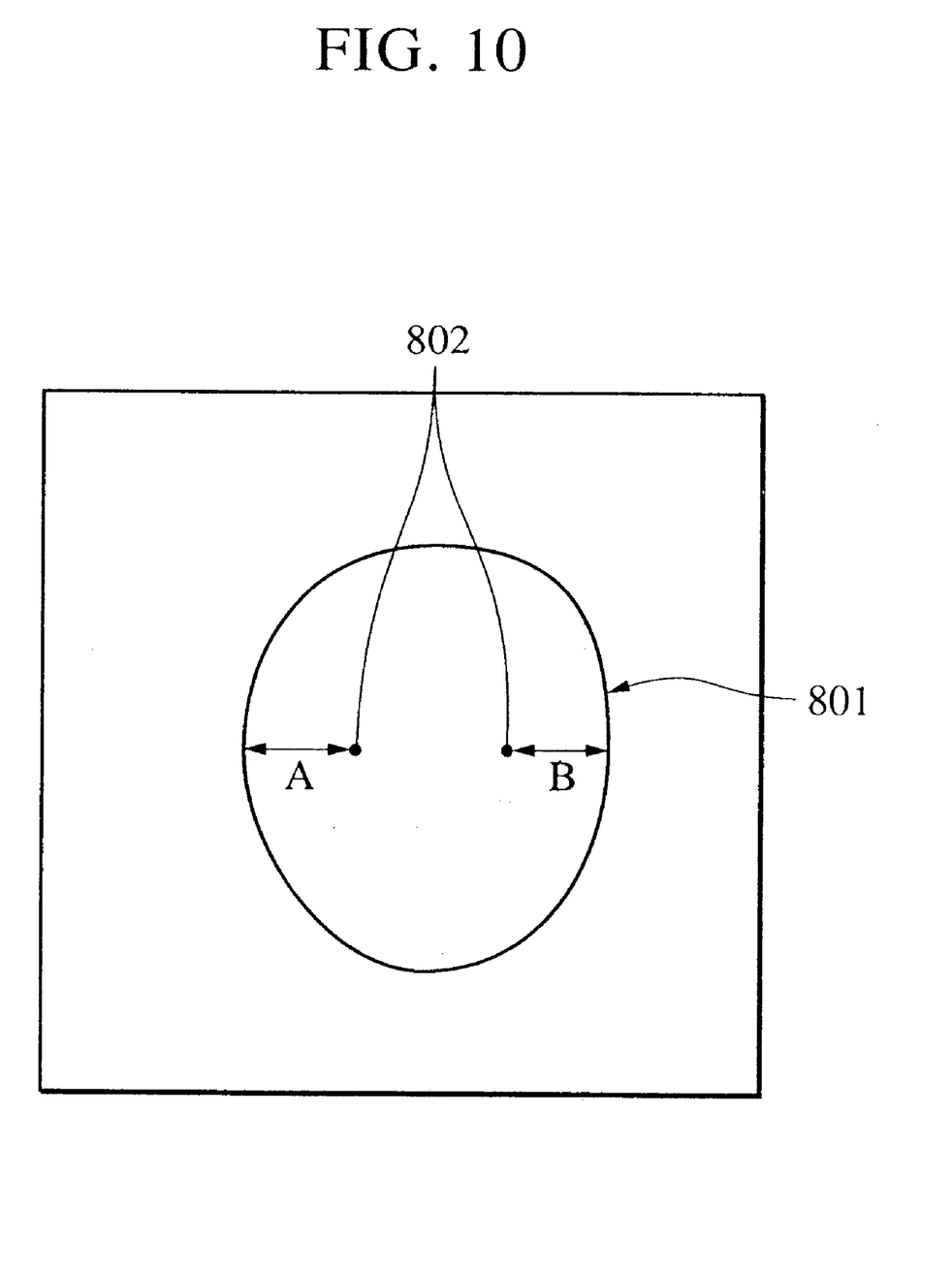
FIG. 10 is a chart illustrating the outline of a face and the positions of both eyes, picked up by a CCD camera in the third embodiment.

The procedure for determining the use of the apparatus, based on the image picked up by the CCD camera 701, will be described below, by referring to FIG. 10 illustrating both the outline of a face picked up by the CCD camera 701 and the positions of both eyes. In FIG. 10 the outline 801 of the face and the positions of both eyes 802 extracted are shown.

The direction of view of the user is determined in the following manner: if A<<C and B<<C where C represents a constant, it is determined that the direction of view is directed to the apparatus; and if A and B do not satisfy the above relation, it is determined that the direction of view is not directed to the apparatus.

When it is determined that the direction of view is directed to the apparatus, the view-direction detector 702 sends a signal resenting the use of the apparatus to the screen control determiner 105. The use condition corresponds to the state in which the pushbutton switch 104 is being turned on in the first embodiment, or the state in which the pushbutton switch 104 is being turned off in the second embodiment. When the direction of view is not directed to the apparatus, the view-direction detector 702 sends a signal representing the non-use condition to the screen control determiner 105.

In the third embodiment, when the user is not directed to the apparatus, screen control can be forbidden.

In accordance with the foregoing embodiments, screen control, which is conventionally done based on an inclination of the apparatus, is performed, based on the detected inclination and use condition of the apparatus. Thereby, it is possible to prevent screen control from malfunctioning as unexpected by the user, and thereby improve the operatability of the apparatus.

Figure 11A:
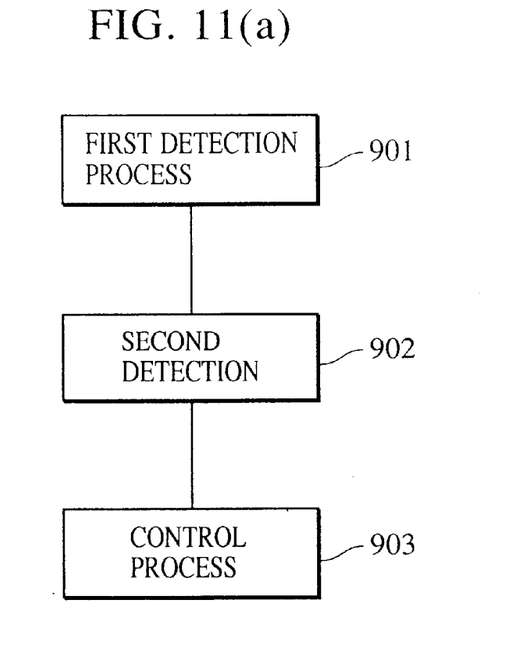
FIG. 11A is a configuration chart showing a procedure included in the monitor program used in the embodiments.
Figure 11B:
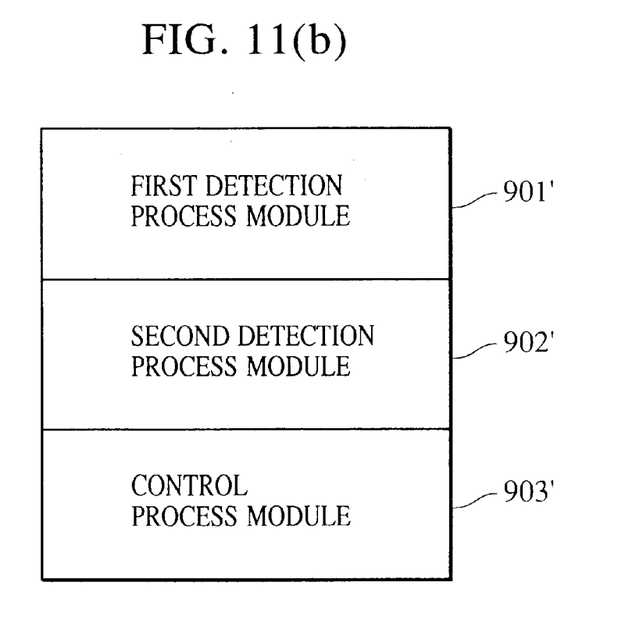
FIG. 11B is a memory map of the storage medium used in the embodiments.

The objects of the present invention achieved by the function of the foregoing apparatus or method can be also achieved by using a storage medium in which the processes in the embodiments are stored. In other words, this storage medium is loaded in the apparatus, and the processes read from the storage medium can achieve the novel function of the present invention by themselves. In the embodiments an integrated circuit card provides a monitor program, which is loaded into the RAM so as to be executed. As a mode of the provision of programs communications means such as a local area network can be used. In FIGS. 11A and 11B the characteristic configurations of the programs in connection with the present invention are shown.

FIG. 11A is a configuration chart showing a procedure employed in the monitor program in the embodiments, while FIG. 11B is a memory map of the storage medium in the embodiments.

In a first detection process 901 an inclination of the apparatus is detected. This process corresponds to step S201 shown in FIG. 3. In a second detection process 902 the use of the apparatus is detected. This process corresponds to step S202 shown in FIG. 3. In a control process 903 the execution of a predetermined process is controlled, based on the inclination and use condition of the apparatus detected in the processes 901 and 902. This control process corresponds to steps S203 to S205.

In the memory map shown in FIG. 11B a first detection module 901', a second detection module 902', and a control process module 903' are program modules for executing the first detection process 901, the second detection process 902, and the control process 903, respectively.

The present invention may be applied to both a system consisting of a plurality of electronic apparatuses and a system consisting of a single electronic apparatus. It goes without saying that the present invention may be applied to an electronic apparatus or system in which its function is achieved by providing a program. In this case a storage medium in which the program is stored forms the present invention. The apparatus or system is operated in a predetermined manner by loading the program into the apparatus or system from the storage medium.

What is claimed is:

1. An electronic apparatus including:
   first detection means for detecting an inclination of said apparatus;
   second detection means for detecting a state of an instruction member arranged on said apparatus, wherein the instruction member indicates whether the inclination of said apparatus should be used to control a display screen; and
   control means for controlling the display screen when the inclination detected by said first detection means continues for a predetermined period, said control means controlling the display screen based on both the inclination detected by said first detection means and the state of the instruction member detected by said second detection means,
   wherein said control means controls one of a scrolling operation and a page turning operation of the display screen such that a page is turned immediately when the inclination of said apparatus is greater than a predetermined angle.

2. An electronic apparatus according to claim 1, wherein said instruction member comprises a pushbutton switch device.

3. An electronic apparatus according to claim 2, further including an input stylus, wherein
   the pushbutton switch is disposed on said apparatus in a stylus holder where the input stylus is held, and
   the pushbutton switch is turned on by setting the input stylus in the stylus holder of said apparatus.

4. An electronic apparatus according to claim 1, further including view detection means for detecting the direction of the view of the user,
   wherein said second detection means detects the use of said apparatus, based on the direction of the view of the user detected by said view detection means.

5. An electronic apparatus according to claim 1, wherein said control means controls the display screen based on at least one of a duration of inclination of said apparatus, a direction of inclination of said apparatus, and an angle of inclination of said apparatus.

6. An electronic apparatus according to claim 1, wherein said control means scrolls the display screen when an inclination of said apparatus is below or equal to a predetermined angle, or turns a page when an inclination of said apparatus is over the predetermined angle.

7. A control method of an electronic apparatus including an instruction member, the method including:
   a first detection step for detecting an inclination of said apparatus;
   a second detection step for detecting a state of the instruction member, wherein the instruction member indicates whether the inclination of said apparatus should be used to control a display screen; and
   a control step for controlling the display screen when the inclination detected by said first detection step continues for a predetermined period, said control means controlling the display screen based on both the inclination of said apparatus detected in said first detection step and the state of the instruction member detected in said second detection step,
   wherein said control step controls one of a scrolling operation and a page turning operation of the display screen such that a page is turned immediately when the inclination of said apparatus is greater than a predetermined angle.

8. A control method of an electronic apparatus according to claim 7, wherein the instruction member comprises a pushbutton switch device.

9. A control method of an electronic apparatus according to claim 8, wherein
   the pushbutton switch is disposed on said apparatus in a stylus holder where an input stylus is held, and
   the pushbutton switch is turned on by setting the input stylus in the stylus holder of said apparatus.

10. A control method of an electronic apparatus according to claim 7, further including a view detection step for detecting the direction of the view of the user,
    wherein said second detection step detects the use of said apparatus, based on the direction of the view of the user detected by said view detection means.

11. A control method of an electronic apparatus according to claim 7, wherein said control step controls the display screen based on at least one of a duration of inclination of said apparatus, a direction of inclination of said apparatus, and an angle of inclination of said apparatus.

12. A control method of an electronic apparatus according to claim 7, wherein said control step scrolls the display screen when an inclination of said apparatus is below or equal to a predetermined angle, or turns a page when an inclination of said apparatus is over the predetermined angle.

13. An electronic apparatus including an instruction member, in which a computer unit is controlled by inputting a predetermined program from a memory medium, wherein said memory medium includes:
  a procedure code used in a first detection step for detecting an inclination of said apparatus;
  a procedure code used in a second detection step for detecting a state of the instruction member arranged on said apparatus, wherein the instruction member indicates whether the inclination of said apparatus should be used to control a display screen; and
  a procedure code in a control step for controlling the display screen when the inclination detected in said first detection step continues for a predetermined period, said control step controlling the display screen based on both the inclination of said apparatus detected in said first detection step and the state of the instruction member detected in said second detection step,
  wherein said control step controls one of a scrolling operation and a page turning operation of the display screen such that a page is turned immediately when the inclination of said apparatus is greater than a predetermined angle.

14. An electronic apparatus according to claim 13, wherein said control step controls the display screen based on at least one of a duration of inclination of said apparatus, a direction of inclination of said apparatus, and an angle of inclination of said apparatus.

15. An electronic apparatus according to claim 13, wherein said control step scrolls the display screen when an inclination of said apparatus is below or equal to a predetermined angle, or turns a page when an inclination of said apparatus is over the predetermined angle.

* * * * *

UNITED STATES PATENT AND TRADEMARK OFFICE
CERTIFICATE OF CORRECTION

PATENT NO.    : 6,300,933 B1              Page 1 of 1
DATED         : October 9, 2001
INVENTOR(S)   : Katsuhiko Nagasaki et al.

It is certified that error appears in the above-identified patent and that said Letters Patent is hereby corrected as shown below:

<u>Column 6,</u>
Line 43, "A<<C and B<<C" should read -- A>>C and B>>C --

Signed and Sealed this

Third Day of September, 2002

Attest:

Attesting Officer

JAMES E. ROGAN
Director of the United States Patent and Trademark Office